(12) United States Patent
Sirota et al.

(10) Patent No.: US 11,263,084 B2
(45) Date of Patent: *Mar. 1, 2022

(54) SAVING PROGRAM EXECUTION STATE

(71) Applicant: Amazon Technologies, Inc., Reno, NV (US)

(72) Inventors: Peter Sirota, Seattle, WA (US); Ian P. Nowland, Seattle, WA (US); Richard J. Cole, Seattle, WA (US); Richendra Khanna, Seattle, WA (US); Luis Felipe Cabrera, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,516

(22) Filed: Jan. 10, 2018

(65) Prior Publication Data

US 2018/0129570 A1    May 10, 2018

Related U.S. Application Data

(63) Continuation of application No. 14/571,093, filed on Dec. 15, 2014, which is a continuation of application
(Continued)

(51) Int. Cl.
G06F 15/173 (2006.01)
G06F 11/14 (2006.01)
G06F 9/48 (2006.01)

(52) U.S. Cl.
CPC .......... G06F 11/1451 (2013.01); G06F 9/485 (2013.01); G06F 9/4806 (2013.01); G06F 11/1469 (2013.01)

(58) Field of Classification Search
CPC ............. G06F 11/1451; G06F 11/1469; G06F 9/4806; G06F 9/485
See application file for complete search history.

(56) References Cited

U.S. PATENT DOCUMENTS 6,128,642 A   10/2000  Doraswamy et al.
6,490,693 B1  12/2002  Briskey et al.
(Continued)

FOREIGN PATENT DOCUMENTS

CN      1368809 A     9/2002
CN    101038564 A     9/2007
(Continued)

OTHER PUBLICATIONS

AmazonEC2—Hadoop Wiki, retrieved on Dec. 12, 2008 from http://wiki.apache.org/hadoop/AmazonEC2?action=print, 10 pages.
(Continued)

Primary Examiner — Hua Fan
(74) Attorney, Agent, or Firm — Robert C. Kowert; Kowert, Hood, Munyon, Rankin & Goetzel, P.C.

(57) ABSTRACT

Techniques are described for managing distributed execution of programs. In at least some situations, the techniques include decomposing or otherwise separating the execution of a program into multiple distinct execution jobs that may each be executed on a distinct computing node, such as in a parallel manner with each execution job using a distinct subset of input data for the program. In addition, the techniques may include temporarily terminating and later resuming execution of at least some execution jobs, such as by persistently storing an intermediate state of the partial execution of an execution job, and later retrieving and using the stored intermediate state to resume execution of the execution job from the intermediate state. Furthermore, the techniques may be used in conjunction with a distributed program execution service that executes multiple programs on behalf of multiple customers or other users of the service.

20 Claims, 8 Drawing Sheets

Related U.S. Application Data

No. 13/737,815, filed on Jan. 9, 2013, now Pat. No. 8,935,404, which is a continuation of application No. 12/334,004, filed on Dec. 12, 2008, now Pat. No. 8,370,493.

(56) References Cited

U.S. PATENT DOCUMENTS

| | | | |
|---|---|---|---|
| 6,934,755 | B1 | 8/2005 | Saulpaugh et al. |
| 7,155,558 | B1* | 12/2006 | Vaghani ............... G06F 3/0607 711/4 |
| 7,559,060 | B2 | 7/2009 | Schmidt et al. |
| 7,590,746 | B2 | 9/2009 | Slater et al. |
| 7,953,843 | B2 | 5/2011 | Cherkasova |
| 8,086,726 | B2 | 12/2011 | Hofmann |
| 2003/0018682 | A1 | 1/2003 | Katayama |
| 2003/0035009 | A1 | 2/2003 | Kodosky et al. |
| 2003/0149735 | A1 | 8/2003 | Stark et al. |
| 2004/0210907 | A1 | 10/2004 | Lau et al. |
| 2005/0033846 | A1 | 2/2005 | Sankaranarayan et al. |
| 2005/0262493 | A1 | 11/2005 | Schmidt et al. |
| 2006/0009945 | A1 | 1/2006 | Fuller, III et al. |
| 2007/0022264 | A1 | 1/2007 | Bromling et al. |
| 2007/0135936 | A1 | 6/2007 | Dumas et al. |
| 2007/0174815 | A1 | 7/2007 | Chrysanthakopoulos et al. |
| 2007/0260733 | A1 | 11/2007 | Havemose et al. |
| 2007/0271570 | A1 | 11/2007 | Brown et al. |
| 2007/0277056 | A1 | 11/2007 | Varadarajan et al. |
| 2007/0277154 | A1* | 11/2007 | Badwe ............... G06F 11/3688 717/124 |
| 2008/0082983 | A1 | 4/2008 | Groetzner et al. |
| 2008/0104220 | A1* | 5/2008 | Vanyukhin ......... H04L 41/0893 709/223 |
| 2008/0114887 | A1 | 5/2008 | Bryers et al. |
| 2008/0115143 | A1* | 5/2008 | Shimizu ............... G06F 9/5066 718/105 |
| 2008/0120314 | A1 | 5/2008 | Yang et al. |
| 2008/0189578 | A1 | 8/2008 | Raghuraman et al. |
| 2008/0209275 | A1* | 8/2008 | Kwan ................. G06F 11/3688 714/38.14 |
| 2008/0250227 | A1 | 10/2008 | Linderman et al. |
| 2009/0024981 | A1 | 1/2009 | Dye et al. |
| 2009/0037572 | A1 | 2/2009 | Gebhart et al. |
| 2009/0083390 | A1 | 3/2009 | Abu-Ghazaleh et al. |
| 2009/0237084 | A1 | 9/2009 | Itskovich et al. |
| 2009/0254621 | A1 | 10/2009 | Skowronski |
| 2010/0076805 | A1 | 3/2010 | Batsakis et al. |
| 2010/0122065 | A1 | 5/2010 | Dean et al. |
| 2011/0239010 | A1 | 9/2011 | Jain et al. |

FOREIGN PATENT DOCUMENTS

| | | |
|---|---|---|
| JP | 63-85846 A | 4/1988 |
| JP | 8-123768 A | 5/1996 |
| JP | 2008-502953 A | 1/2008 |
| JP | 2008-123357 A | 5/2008 |
| JP | 2008-293358 A | 12/2008 |

OTHER PUBLICATIONS

Hadoop, retrieved on Dec. 12, 2008, from http://en.wikipedia.org/wiki/Hadoop, 5 pages.

MapReduce, retrieved on Dec. 12, 2008, from http://en.wikipedia.org/wiki/Mapreduce, 6 pages.

Storage Area Network, retrieved on Dec. 12, 2008, from http://en.wikipedia.org/wiki/Storage_area_network, 5 pages.

RAID, retrieved on Dec. 12, 2008, from http://en.wikipedia.org/wiki/RAID, 14 pages.

Varia, J., "Building GrepTheWeb in the Cloud, Part 1: Cloud Architectures," Jul. 16, 2008, retrieved Dec. 12, 2008, from http://developer.amazonwebservices.com/connect/entry!default.jspa?categoryID=152&ex . . . , 8 pages.

Varia, J., "Building GrepTheWeb in the Cloud, Part 2: Best Practices," Jul. 15, 2008, retrieved Dec. 12, 2008, from http://developer.amazonwebservices.com/connect/entry!default.jspa?categoryID=152&ex . . . , 3 pages.

White, T., "Running Hadoop MapReduce on Amazon EC2 and Amazon S3," Jul. 18, 2007, retrieved Dec. 12, 2008, from http://developer.amazonwebservices.com/connect/entry.jspa?externalID=873, 7 pages.

"Condor Project Homepage," retrieved on Mar. 26, 2009, from http://www.cs.wisc.edu/condor/, 3 pages.

"What is Condor?" retrieved on Mar. 26, 2009, from http://www.cs.wisc.edu/condor/description.html, 2 pages.

"Overview of the Condor High Throughput Computing System," retrieved Mar. 26, 2009, from http://www.cs.wisc.edu/condor/overview/, 4 pages.

"Welcome to Hive!" retrieved on Mar. 26, 2009, from http://hadoop.apache.org/hive/, 1 page.

"Hive—Hadoop Wiki," retrieved on Mar. 26, 2009, from http://wiki.apache.org/hadoop/Hive?action=print, 2 pages.

"Project Pig," retrieved on Mar. 26, 2009, from http://research.yahoo.com/node/90, 1 page.

Olsten et al., "Pig Latin: A Not-So-Foreign Language for Data Processing," *SIGMOD* '08, Jun. 9-12, 2008, Vancouver, BC, Canada, 12 pages.

Badrinath, R., et al., "Virtualization Aware Job Schedulers for Checkpoint-Restart," International Conference on Parallel Distributed Systems, IEEE, Piscataway, NJ, Dec. 5, 2007, pp. 1-7.

Casas, J., et al., "MPVM: A Migration Transparent Version of PVM," Computing Systems, vol. 8, No. 2, Spring 1995, pp. 171-216.

Mehnert-Spahn et al., "Checkpointing Process Groups in a Grid Environment," 2008 Ninth International Conference on Parallel and Distributed Computing, Applications and Technologies, Dec. 1-4, 2008, 9 pages.

Wang et al., "The Cumulus Project: Build a Scientific Cloud for a Data Center," Cloud Computing and its Applications, Oct. 22-23, 2008, Chicago, Ill., 7 pages.

Hua et al., "Distributed Layered Resource Management Model in Blue Whale Distributed File System," *Journal of Computer Research and Development* 42(6):1034-1038, 2005.

Nakajima et al., "Design of a scalable programming environment for large capacity computing in a large P2P grid environment," *IPSJ SIG Technical Report* 2006(87):115-120, Information Processing Society of Japan, Japan, Aug. 1, 2006.

Dean et al., "MapReduce: Simplified Data Processing on Large Clusters," OSDI 2004, 13 pages.

Marozzo et al., "Adapting MapReduce for dynamic environments using a peer-to-peer model", 1$^{st}$ Workshop on Cloud Computing and its Applications, Oct. 23, 2008, retrieved from http://citeseerx.ist.psu.edu/viewdoc/download?doi=10.1.1.157.9239&rep1&type=pdf on Mar. 9, 2016, 7 pages.

* cited by examiner

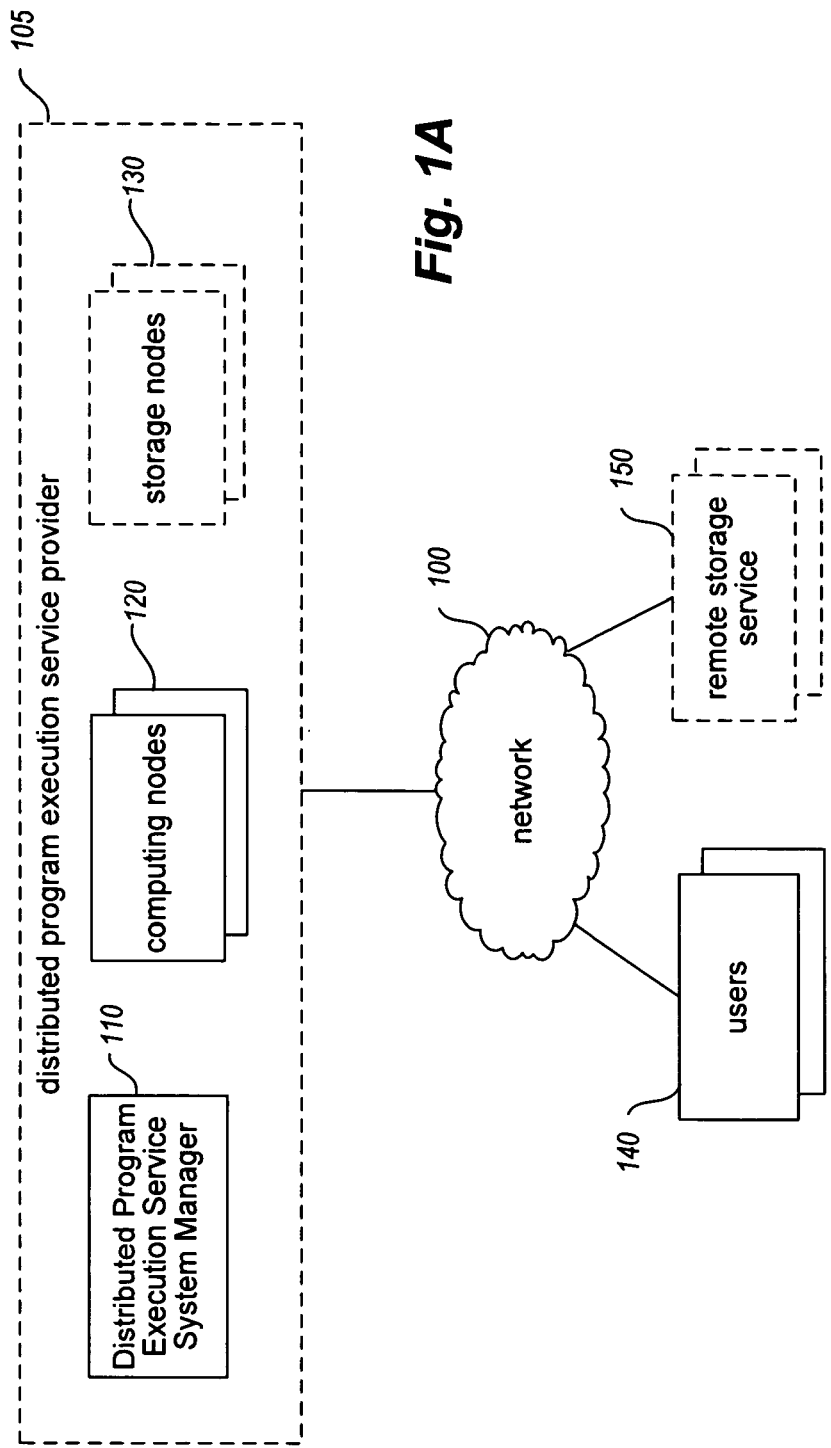

SAVING PROGRAM EXECUTION STATE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

BRIEF DESCRIPTION OF THE DRAWINGS

FIGS. 1A and 1B are network diagrams illustrating example embodiments of use of a distributed program execution service by remote users.

DETAILED DESCRIPTION

Figure 1B:
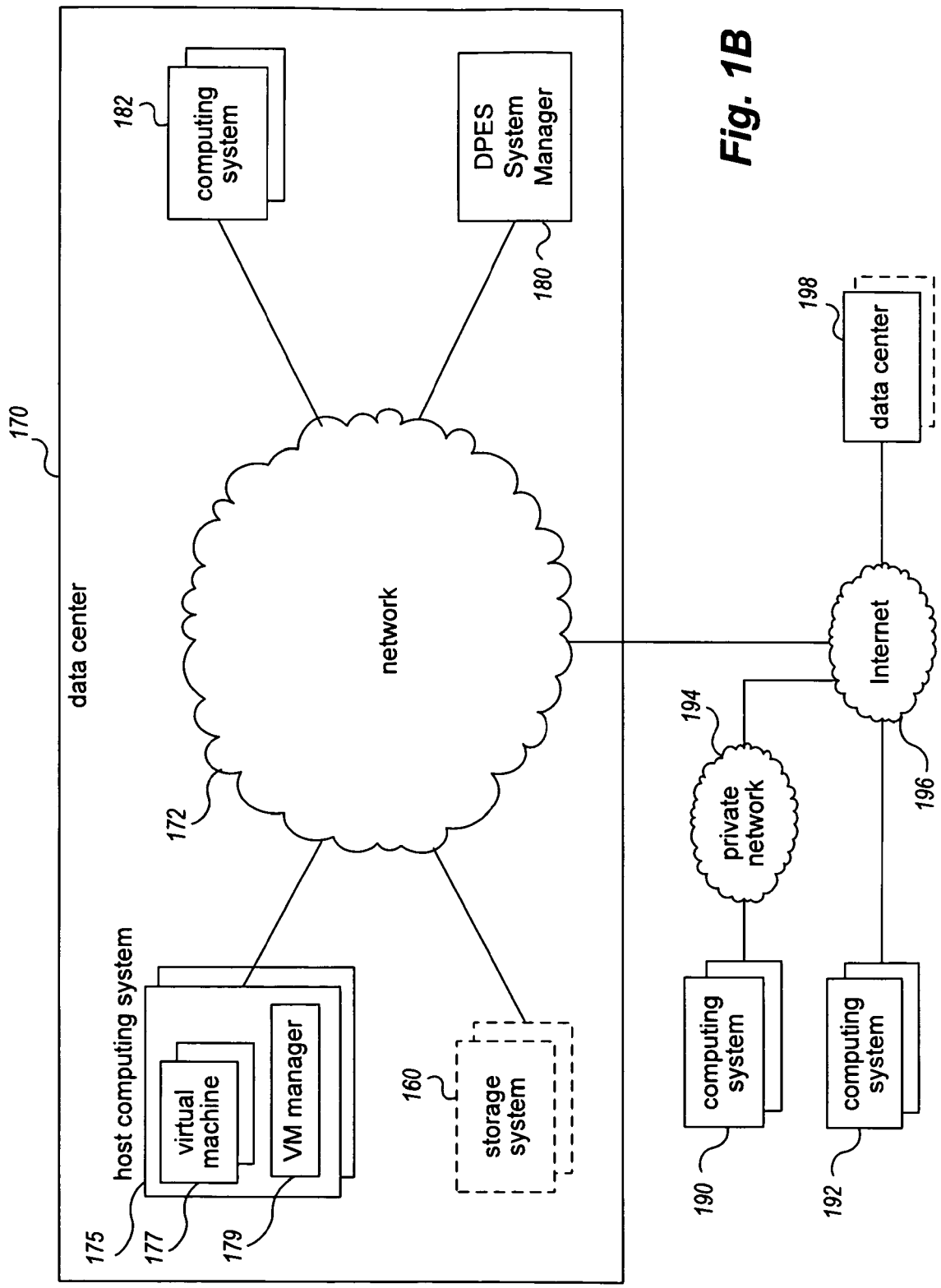

Techniques are described for managing distributed execution of programs. In at least some embodiments, the techniques for managing the distributed execution of a program include decomposing or otherwise separating the program execution into multiple distinct execution jobs that may each be executed on a distinct computing node, such as in a parallel or other distributed manner with each execution job using a distinct subset of input data for the program.

In addition, the techniques may include temporarily terminating and later resuming the execution of at least some execution jobs, such as by persistently storing an intermediate state of partial execution of an execution job before the execution termination, and later retrieving and using that intermediate state information during the execution resumption of that execution job. Furthermore, in at least some situations, the techniques may be used in conjunction with an embodiment of a distributed program execution ("DPE") service that executes multiple programs on behalf of multiple customers or other users of the service, such as a service that provides multiple computing nodes (e.g., multiple physical computing systems and/or virtual machines that are hosted on one or more physical computing systems) for use in executing programs in a distributed manner. In at least some embodiments, some or all of the techniques may be automatically performed by embodiments of a Distributed Program Execution Service System Manager module, as described in greater detail below.

The distributed execution of a program may be initiated in various manners in various embodiments, such as by a user of an embodiment of a DPE service interacting with the DPE service to request the execution of the program. For example, the DPE service may provide a graphical user interface ("GUI") that a remote user may use to make the request (e.g., a Web-based GUI with which a user interacts via a client application, such as a Web browser, executing on a client device of the user), and/or the DPE service may provide one or more APIs ("application programming interfaces") that enable a computing device of the user to programmatically interact with the DPE service to make the request (e.g., one or more APIs that are also used by the provided GUI).

The user may specify various information as part of such a request, such as an indication of the program to execute (e.g., by supplying an executable copy of the program, by indicating a program previously registered by the user with the DPE service, by indicating a program made available by the DPE service for use by users, etc.), and an indication of input data for use by the executing program (e.g., by supplying the input data or by indicating an accessible location from which the input data may be obtained). In addition, the user may further specify other configuration information for the distributed program execution in at least some embodiments, such as one or more of the following: configuration information for use in configuring a particular instance of the program for use with the requested execution; an indication of a quantity of computing nodes to use for the requested execution; an indication of a type of computing node to use for the requested execution (e.g., if the DPE service provides different types of computing nodes with different capabilities, such as different amounts of memory, storage and/or processing power) and/or one or more other execution criteria to use in performing the requested execution (e.g., a user-specified QoS ("Quality of Service") level associated with the requested execution, an indication of a time by which the requested execution is to be completed, etc.); an indication of multiple execution jobs into which the indicated program execution is to be separated for parallel or other distributed execution, or instead an indication of how the DPE service is to automatically determine those multiple execution jobs (e.g., if the indicated program is designed to be separable in a defined manner into distinct execution jobs); etc.

After program execution is requested or otherwise initiated, whether by a user or in another manner, that program execution may be separated into multiple execution jobs for parallel or other distributed execution in various manners in various embodiments. For example, as previously noted, the program may be designed to be separable in a defined manner into distinct execution jobs (e.g., to support task-level parallelism), and if so a user may indicate how to generate multiple execution jobs and/or the DPE service may automatically generate the multiple execution jobs. Furthermore, some types of programs may perform various operations on each of a number of pieces of input data, and in such situations, data parallelism techniques may be used to separate the group of input data for use in the program execution into multiple subsets that are each supplied to a distinct execution job (e.g., with each execution job performing some or all of the same operations on the input data subset used for that execution job). As one simple example, a particular program execution may include searching a large number of Web pages for two particular terms (or alternatively indexing the Web pages for use in later searches), and the program execution could be separated into a large number of execution jobs that execute simultaneously in parallel to each search (or index) a distinct subset of the Web pages (e.g., a single Web page, or a small number of the Web pages) for one or both of the terms. Non-exclusive examples of types of programs that may be separated into multiple execution jobs (e.g., to support task parallelism and/or data parallelism) include the MapReduce program for processing and generating large data sets, the Hadoop program implementation of MapReduce techniques, various types of image, video and speech processing, various types of analysis of and searching through textual data sets or other types of input data, etc. Additional details related to the MapReduce program are included in "MapReduce: Simplified Data Processing on Large Clusters" by Jeffrey Dean and Sanjay Ghemawat, December 2004, Proceedings of OSDI'04: Sixth Symposium on Operating System Design and Implementation, available at the time of application filing at labs<dot>google<dot>com<slash>papers<slash>mapreduce-osdi04.pdf (where "<dot>" and "<slash>" are replaced with corresponding characters "." and "/"), which is incorporated herein by reference in its entirety.

In addition, in at least some embodiments, the managing of the distributed execution of a program may include monitoring or otherwise tracking the ongoing execution of some or all execution jobs for the program, such as to determine when particular execution jobs begin execution and complete execution. Such tracking of the execution of execution jobs may provide various benefits, such as to determine when to later initiate execution of other execution jobs (e.g., if the output data generated by a first execution job is at least some of the input data for a second execution job, so as to assist in determining when to execute the second execution job), and/or to determine when all execution jobs of a program have been completed. Furthermore, in at least some embodiments, some or all execution jobs may each have multiple distinct operations (which also may be referred to as "tasks" in some situations) that are to be performed, such as in a sequential and/or parallel manner, and the monitoring or other tracking of the ongoing execution of such execution jobs may further include determining information about the status of the partial performance of some or all such operations, such as to reflect intermediate data that is generated by completed performance of some such operations. Such tracking of the performance of particular operations for an execution job may further provide various benefits, such as to enable the ongoing intermediate execution and data state from the partial execution of the execution job to be tracked and used, as described in greater detail below. The monitoring or other tracking may be performed in various manners, such as by using a system manager component to initiate execution of execution jobs on particular computing nodes, and to subsequently obtain status information from the computing nodes (e.g., by the system manager component pulling status information from the computing nodes, such as by periodically requesting status information from each computing node, and/or by the computing nodes pushing status information to the system manager component, such as periodically or when particular events occur).

When executing an execution job for a program on a computing node, various information related to the execution may be stored in various manners. For example, when the execution is initiated, the input data to be used by the execution job may be locally stored on the computing node (e.g., on a local hard disk or other local storage device) to facilitate access to that input data during execution, and any software instructions to be executed for the execution job may similarly be locally stored on the computing node. Such information to be locally stored may be supplied to the computing node under control of the system manager component of the DPE service, such as from a highly available long-term storage location for the DPE service that is remote from the multiple computing nodes used to execute the program (e.g., a long-term storage location that is available from a network-accessible remote storage service). In addition, after the execution of the execution job is completed and any output data from the execution is generated, that output data may similarly be locally stored on the computing node, such as temporarily until that output data is copied back to the long-term storage location for the DPE service for use by other execution jobs or otherwise in generating the final output results for the execution of the program. After the execution of the execution job of the program is completed, the local storage on the computing node may in some embodiments be erased or otherwise cleared after any output data from the execution is copied back to the DPE service's long-term storage location, such as in preparation for or as part of initiating execution of another execution job on the computing node (e.g., another execution job of a different program for a different user). In other embodiments, the local storage on the computing node may instead be maintained even after the execution of an execution job is completed (e.g., until execution of the program is complete).

Furthermore, in at least some embodiments, various intermediate output data and other intermediate results from the partial execution of an execution job on a computing node may be temporarily stored locally on the computing node during the execution, such as to correspond to output data produced by a subset of the operations of the execution job whose performance is completed, and/or to correspond to partial or incomplete output data produced by one or more operations whose performance has been initiated but not completed. In at least some embodiments in which a long-term storage location of the DPE service is used, such intermediate results are not stored on the DPE service's long-term storage location (e.g., to minimize execution delay and network traffic involved in copying such intermediate results to the DPE service's long-term storage location), while in other embodiments some or all such intermediate results may be stored on the DPE service's long-term storage location.

As one example of intermediate results, referring back to the prior simplified example of an execution job that involves searching through multiple Web pages for two terms, each operation of the execution job may correspond to searching through a single Web page for a single term, with the intermediate output data from performance of such an operation being information about any occurrences of that term in that Web page (e.g., a cumulative number of times that the term is located; information about each occurrence of the term in that Web page, such as its location in the Web page; etc.). Alternatively, as another example, a particular execution job may involve searching through a Web log or other transaction record that has numerous entries (e.g., with each line in the Web log representing an entry) for a particular term, and each operation of the execution job may involve searching a particular input data entry for that term, with the intermediate output data from performance of such an operation similarly including information about whether the input data entry includes the term.

By storing the output data from the completed execution of an execution job in the DPE service's long-term storage location, the availability of that output data may be maintained even if a particular computing node subsequently fails or otherwise becomes unavailable. However, if intermediate results from partial execution of an execution job are not stored on the DPE service's long-term storage location, a termination of the execution of that execution job before completion could result in those intermediate results being lost, such that the execution job would need to later be executed again from the beginning (e.g., to repeat performance of all operations of the execution job, even if some of the operations were previously completed).

Accordingly, the described techniques include managing distributed execution of a program in such a manner as to store and use such intermediate results from partial execution of an execution job that is terminated before completion, so that a later resumption of the execution of the execution job may resume at or near the intermediate point of partial execution before termination. For example, if a determination is made to terminate execution of one or more execution jobs of a program on one or more computing nodes before the execution of those execution jobs is complete, the system manager component may initiate the persistent storage of the intermediate results from the partial execution of those execution jobs, such as at a location remote from those computing nodes. When the execution of those execution jobs is later resumed, whether on those same computing nodes or other computing nodes, the persistently stored intermediate results from the prior partial executions may be retrieved and used in the resumed execution in various ways. For example, if multiple operations of a particular terminated execution job had been completed before the termination, the intermediate results from the performance of those operations may be retrieved for the resumed execution, and those completed operations need not be performed again for the resumed execution.

The termination of partially completed execution jobs may be performed for various reasons in various embodiments. For example, in some embodiments a user who has requested execution of a program may request that the execution of some or all execution jobs for the program be suspended, such as for an indicated period of time or until the user later requests a resumption of the program suspension. In other embodiments, the DPE service may initiate the termination of the execution of one or more execution jobs of a program. For example, the execution of an execution job on a first computing node may be terminated and moved to another second computing node, such as if the first computing node is to be shut down for maintenance, is to be used for another execution job or other program (e.g., another execution job or other program with a higher priority), is being over-utilized, is showing signs of possible failure, etc. In addition, in a manner similar to that of the indicated user request, the DPE service may determine to suspend all execution of a program for a period of time.

As previously noted, various information may be locally stored on a computing node during execution of an execution job, and the locally stored information may be stored in various manners. For example, in some embodiments, a distributed file system or other distributed data store may be created on the multiple computing nodes used for distributed execution of a program, with a particular computing node's locally stored data being stored in the local portion of that distributed data store. Furthermore, if the distributed data store for a particular embodiment includes redundant data that allows for recovery of the data locally stored on a particular computing node that fails or otherwise becomes unavailable, then the availability of the output data from the execution of an execution job may be maintained in many situations for that embodiment even without the use of separate long-term storage for the DPE service. In other embodiments, some or all information may be stored in other manners, such as by not using a long-term storage location of the DPE service (e.g., by maintaining locally stored data on computing nodes until all execution for the program is completed) and/or by not using local storage on the computing nodes selected to assist in the distributed execution of a program (e.g., by storing any information that is not loaded in volatile memory on the computing node at a remote location, such as the DPE service's long-term storage location).

In addition, when intermediate results of partial execution on a computing node are persistently stored remotely from the computing node, the intermediate results may be stored in various manners. In some embodiments in which the DPE service uses a long-term storage location, the intermediate results may be stored in the DPE service's long-term storage location along with other completed results of execution jobs that have been completed. Alternatively, in some embodiments, the intermediate results for a particular computing node may be stored together, but in a manner distinct from the intermediate and/or completed results of other computing nodes. For example, in some embodiments, a remote logical storage volume may be created to mirror some or all of a local hard disk or other block data storage device for the computing node that was used to store the intermediate results, including a local portion of a distributed file system or other distributed data store. When the partial execution of the execution job for the computing node is later resumed, such a remote logical storage volume may be attached to the computing node on which the resumed execution is to occur, such as to allow the information in the attached logical storage volume to be copied to a physical block storage device of that computing node for use during the resumed execution, or the attached logical storage volume may instead be used during the resumed execution in lieu of any physical block storage device of that computing node. In some such embodiments in which logical storage volumes are available for use, the logical storage volumes may be created at the time of termination of an execution job on a computing node, while in other embodiments the logical storage volume for an execution job may be created at the beginning of the initial execution of the execution job on a computing node and used throughout the entire execution (e.g., in lieu of any physical block storage device of that computing node), even if the execution of the execution job is terminated and resumed one or more times.

Additional details related to the operation of examples of remote storage services that may be used to persistently store program state information and/or other information, including logical storage volumes, are available in U.S. patent application Ser. No. 12/188,943, filed Aug. 8, 2008 and entitled "Providing Executing Programs With Reliable Access To Non-Local Block Data Storage;" and in U.S. patent application Ser. No. 11/371,304, filed Mar. 8, 2006 and entitled "Distributed Storage System With Web Services Client Interface" and claiming priority benefit of U.S. Provisional Patent Application No. 60/754,726 filed Dec. 29, 2005, each of which is hereby incorporated by reference in its entirety. In addition, additional details related to example embodiments of executing different programs of different priorities at different times are included in U.S. patent application Ser. No. 12/334,022, filed concurrently and entitled "Managing Use Of Program Execution Capacity," which is hereby incorporated by reference in its entirety.

For illustrative purposes, some examples and embodiments are described below in which specific types of management of distributed program execution are provided in specific manners. These examples are provided for illustrative purposes and are simplified for the sake of brevity, and it will be appreciated that the inventive techniques may be used in a wide variety of other situations, some of which are described in greater detail below. For example, while particular examples of how to execute programs in distributed manners and to store and use intermediate results from partial execution are described, other types of distributed execution and of storage and use of intermediate results may be used in other embodiments. In addition, while in some embodiments users submit requests to have indicated programs executed in a distributed manner, in other embodiments an embodiment of the DPE service may initiate the execution of such indicated programs and/or may determine to execute a program indicated by a user in a distributed manner (e.g., without knowledge of the user). Furthermore, in some embodiments at least some of the described techniques may be used with at least some programs that are not executed in a distributed manner, such as to terminate partial execution of such a non-distributed program execution by storing intermediate results and using the stored intermediate results to resume the partial execution of the program.

FIG. 1A is a network diagram that illustrates an example of managing distributed execution of programs for multiple users. In the example of FIG. 1A, a number of users 140 are interacting over a network 100 with an illustrated embodiment of a Distributed Program Execution Service System Manager ("DPE Service SM" or "DPESSM") module 110 to initiate distributed execution of programs on one or more computing nodes 120 that are available for executing programs of the users, such as a DPESSM module 110 that provides some or all of the functionality of a particular embodiment of a DPE service (not shown). The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet. In the illustrated embodiment, the DPESSM module 110 and the computing nodes 120 are provided by a DPE service provider 105 as part of a DPE service, as well as one or more optional other storage nodes 130, and the DPESSM module 110 may execute on one or more other computing systems (not shown).

In some embodiments, the illustrated computing nodes 120 are provided by the DPE service provider 105 for distributed execution of programs on behalf of the users, and may include multiple physical computing systems and/or multiple virtual machines that are hosted on one or more physical computing systems (e.g., as is described in more detail with respect to FIG. 1B for one example embodiment). Each of the computing nodes 120 has some amount of computing resources available for executing one or more programs, such as may be measured, for example, by a combination of one or more of processing capacity (e.g., number and/or size of processing units), memory capacity, storage capacity, network bandwidth capacity, etc. In some embodiments, the DPE service provider 105 may provide preconfigured computing nodes, with each preconfigured computing node having similar and/or equivalent amounts of resources available for executing programs on behalf of users, while in other embodiments, the DPE service provider 105 may provide a selection of various different computing nodes, such as each selection having varying amounts and/or types of computing resources (e.g., size, speed and/or type of processing units; number of processing units; amount of memory and/or storage; platform configuration, such as 32-bit or 64-bit; etc.).

In the illustrated embodiment, the various users 140 may interact with the DPESSM module 110 to make requests and specify various information. In various embodiments, such requests and specifications may be made at various times, such as when a user registers to use services of the DPE service and/or at later times. In some embodiments, the DPESSM module 110 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the DPESSM module 110 to subscribe and/or register for services, the user may be issued one or more identifiers (e.g., keys, tokens, user names, etc.) that are associated with the user and are to be used in conjunction with executing programs on behalf of the user. In other embodiments, a module other than the DPESSM module 110 may be provided to perform various operations related to subscription and/or registration services of the DPE service.

In addition, the users may interact with the DPESSM module 110 to configure requests for execution of programs in various ways in various embodiments, such as by specifying a number and/or type of computing nodes for execution of programs, a minimum and/or maximum number of computing nodes to use, an expiration time for the request, a preferred execution time and/or period of execution, a selection of one of multiple priorities for the execution (e.g., with associated fees that increase with increased priority), etc. Furthermore, in some embodiments, a user may interact with the DPESSM module 110 to request immediate execution of one or more programs on a specified number of computing nodes and/or to schedule such execution at one or more future times, such that the DPESSM module 110 may initiate the requested execution on the specified number of computing nodes at a specified time or when one or more specified criteria are satisfied (e.g., when it is determined that a specified number of computing nodes are available).

In this illustrated embodiment, the DPE service provides a variety of functionality for managing distributed execution of programs for multiple users on the computing nodes 120. For example, as previously noted, a particular user may use a GUI or API provided by the module 110 to submit a request for execution of an indicated program using indicated input data, and optionally along with a variety of other types of configuration information. After the request for execution of the program is received, the DPESSM module 110 may select which of the available computing nodes 120 to use for the requested execution in various ways. For example, in some embodiments, the module 110 may simply select an appropriate quantity of computing nodes from any of the available computing nodes with sufficient resources, such as, for example, by randomly selecting from a pool of available computing nodes. In other embodiments, one or more specific computing nodes may be selected on the basis of one or more other factors, such as, for example, a predicted length of and/or likelihood of continued availability of the one or more computing nodes, a physical proximity of the one or more specific computing nodes to one or more other computing nodes, a geographic location of the one or more specific computing nodes and/or of one or more other computing nodes, etc. In addition, after the request is received, the module 110 may further determine how to separate the indicated program into multiple execution jobs to be executed on the multiple selected computing nodes, such as by using information supplied by the user and/or in an automatic manner based on previously obtained information about the design of the indicated program. Similarly, in at least some embodiments and situations, the module 110 may determine how to separate the indicated input data into multiple subsets for use by the multiple execution jobs. For example, in some situations, each execution job may include executing a full copy of the indicated program but on a particular subset of input data, while the other execution jobs similarly execute the full program copy functionality on other input data subsets.

As the execution jobs execute on the various computing nodes, the execution jobs store various information locally on the computing nodes in at least some embodiments. In addition, the DPE service may optionally provide one or more storage nodes 130 that are used by the DPE service to store information related to program execution and/or for other purposes. As discussed in greater detail elsewhere, such information stored on the storage nodes 130 may include status information regarding the intermediate state of partial execution of various execution jobs for various programs, and in some embodiments may optionally include output data that is generated by completed execution jobs. Furthermore, as discussed in greater detail elsewhere, in some embodiments the module 110 may provide indications to cause the intermediate state of partial execution of one or more execution jobs to be persistently stored before the partial execution of the execution job is terminated. Such intermediate state information for the partial execution may be stored in various manners remotely from the computing node on which the partial execution occurred, such as by copying such intermediate state information to one or more of the optional storage nodes 130 and/or by using one or more optional remote storage services 150 that are accessible over the network 100. In some embodiments, the module 110 coordinates the storage of the intermediate state information from the computing node to the remote persistent storage location, such as by using information that the module 110 tracks about the intermediate state of the partial execution, while in other embodiments the activities in performing the persistent storage of the intermediate state information may instead be performed by management software executing on the computing node to locally manage the execution of the execution job. Alternatively, if a particular executing execution job is able to store its own intermediate execution state, the module 110 may instead notify the execution job to perform its own intermediate execution state storage actions before shutting down its own execution.

After the intermediate state of partial execution of an execution job has been persistently stored and the partial execution has been terminated, the partial execution may be resumed from that intermediate state at a later time, such as substantially immediately (e.g., if the execution of the execution job is being moved from a first computing node to a second computing node, as quickly as the intermediate state information may be stored and retrieved), or instead after a longer period of time (e.g., at a later scheduled time, a later time when one or more specified criteria are satisfied, etc.). At the time of execution resumption, the stored intermediate state information may be retrieved from the persistent storage location, and locally stored on or otherwise made available to the computing node on which the execution job execution is to resume. In addition, the partial execution of the execution job may be resumed in various manners, such as by indicating to the execution job not to perform a subset of operations that were previously completed (e.g., if the execution job supports such functionality), by modifying the execution job to only perform a subset of the operations that were not previously completed, etc. Additional details related to the suspension and resumption of execution of execution jobs are described elsewhere.

FIG. 1B illustrates an embodiment in which a DPE service may be provided using one or more data centers that include multiple physical computing systems. In particular, FIG. 1B is a network diagram illustrating an example embodiment in which a DPESSM module 180 of a DPE service manages distributed execution of programs on behalf of users at an example data center 170. The example data center 170 is connected to the Internet 196 external to the data center 170, which in this example provides access to various external computing systems, such as computing systems 190 via private network 194 and computing systems 192. The private network 194 may be, for example, a corporate network that is wholly or partially inaccessible from non-privileged computing systems external to the private network 194. Computing systems 192 may include, for example, a home computing system that connects directly to the Internet (e.g., via a telephone or cable modem, a Digital Subscriber Line ("DSL"), etc.). In addition, one or more other data centers 198 are illustrated that are connected to data center 170 via the Internet 196, such as may further be used by the DPE service in at least some embodiments. For example, the distributed execution of a particular program may include simultaneous and/or sequential execution using computing nodes at multiple data centers or other distinct geographical locations, including to move execution of an execution job from a computing node at one geographical location to a computing node at another geographical location.

The example data center 170 includes a number of physical host computing systems 175, physical computing systems 182, optional storage systems 160, and a DPESSM module 180 of an embodiment of the DPE service. In this example, host computing systems 175 each provide multiple virtual machines 177 and have a virtual machine ("VM") manager component 179 to manage those virtual machines (e.g., a hypervisor or other virtual machine monitor), and some or all of the computing systems 182 may similarly have one or more such virtual machines and/or VM Manager components (not shown). Alternatively, in other embodiments, some or all of the physical host computing systems at the data center may not provide any virtual machines, such as to instead directly execute one or more programs on behalf of end user customers of the DPE service. In addition, in some embodiments, the physical host computing systems 175 and/or physical computing systems 182 may each include other management software (e.g., a management module of the DPE service) to manage the execution of execution jobs on the computing systems. Furthermore, in some embodiments various of the computing systems 175 and 182 may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, one or more such factors may further be used as constraints and/or preferences regarding which computing systems to select for executing particular programs. The optional storage systems 160 may also have various forms, such as computing systems with attached storage (e.g., that may also be used as computing nodes at times), network storage devices that are not used as computing nodes, etc. The example data center 170 further includes an internal network 172 that may include multiple networking devices (not shown), such as switches, edge routers, and core routers, with computing systems 175 and 182, storage systems 160, and the DPESSM module 180 connected to the internal network 172.

The illustrated DPESSM module 180 performs at least some of the described techniques in order to manage distributed execution of programs using the computing systems 175 and 182, and to optionally persistently store at least some program execution results on storage systems 160. When a particular computing node or system is selected to execute one or more execution jobs of a program, the DPESSM module 180 may in some embodiments initiate execution of the execution jobs by interacting with a VM manager component or other manager component that controls execution of programs for that selected computing node/system, or may alternatively directly execute the execution jobs on the selected computing node/system. Users of the DPE service may use various computing systems to interact with the DPESSM module 180, such as computing systems 190 or 192, or computing systems at one of the other data centers 198. In addition, some of the computing systems 190 or 192 or at one of the other data centers 198 may be used to provide one or more network-accessible remote storage services (not shown) that are accessible by the DPE service and used to persistently store at least some intermediate results or other information.

It will be appreciated that the data center of FIG. 1B is provided for illustrative purposes only, and that an embodiment of a DPE service and other software execution services may be provided in other manners in other embodiments. For example, DPESSM module 180 may instead be provided using one or more other computing systems external to the data center 170, such as computing systems 190, 192 or at a data center 198. In addition, in at least some embodiments, the programs for which distributed execution is provided may include executable software images, such as virtual machine images that are bootable or otherwise loadable on one or more virtual machine computing nodes, and that each may include operating system software, software for one or more application programs, and/or configuration information, etc. At least some such programs may be stored by the DPE service and/or by users on the storage systems 160 and/or using a remote storage service, and if so are retrieved by or supplied to the DPE service when they are to be executed on behalf of a user or as otherwise initiated.

Figure 2A:
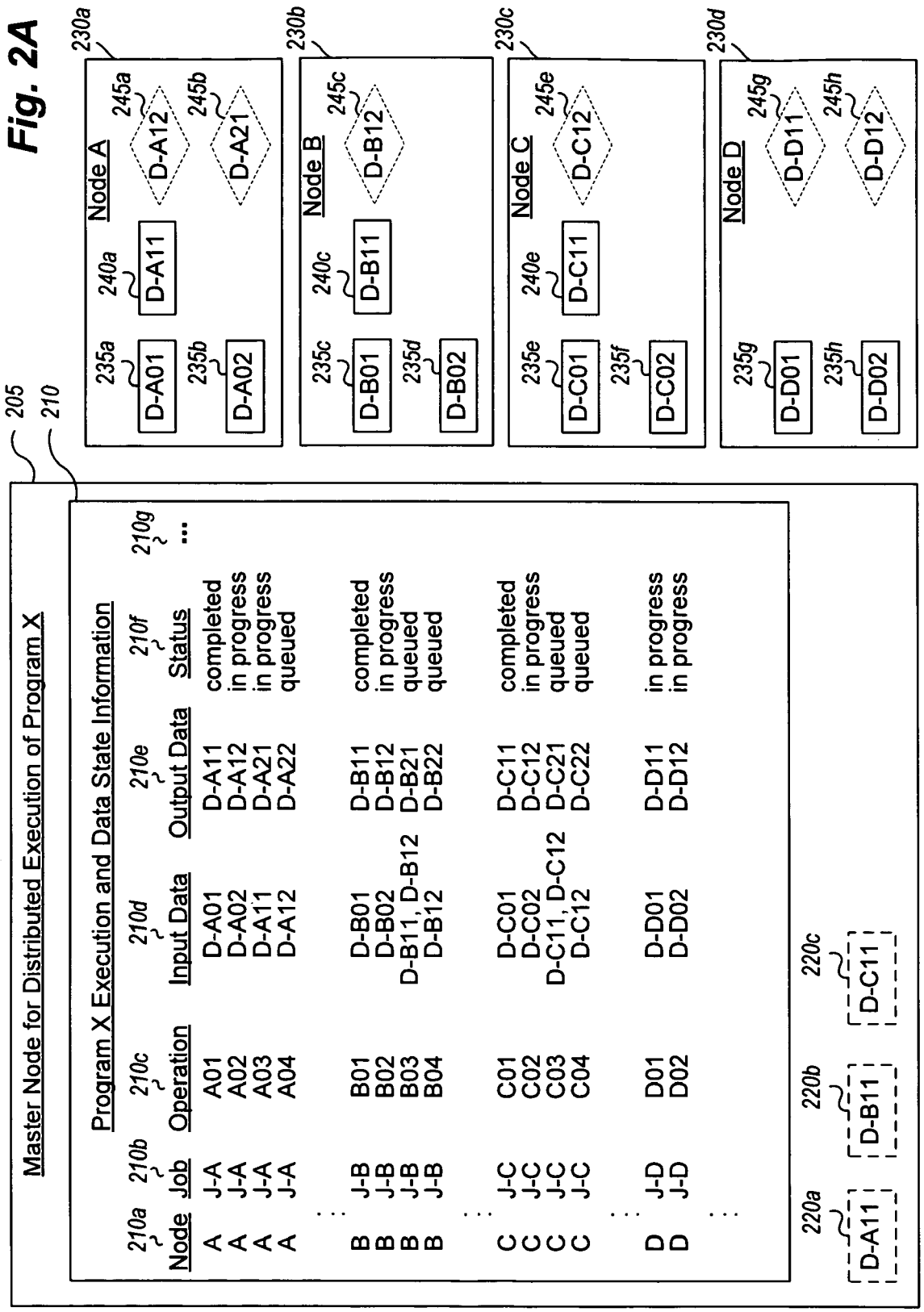
FIGS. 2A and 2B illustrate example embodiments of techniques for managing distributed program execution on multiple computing nodes.
Figure 2B:
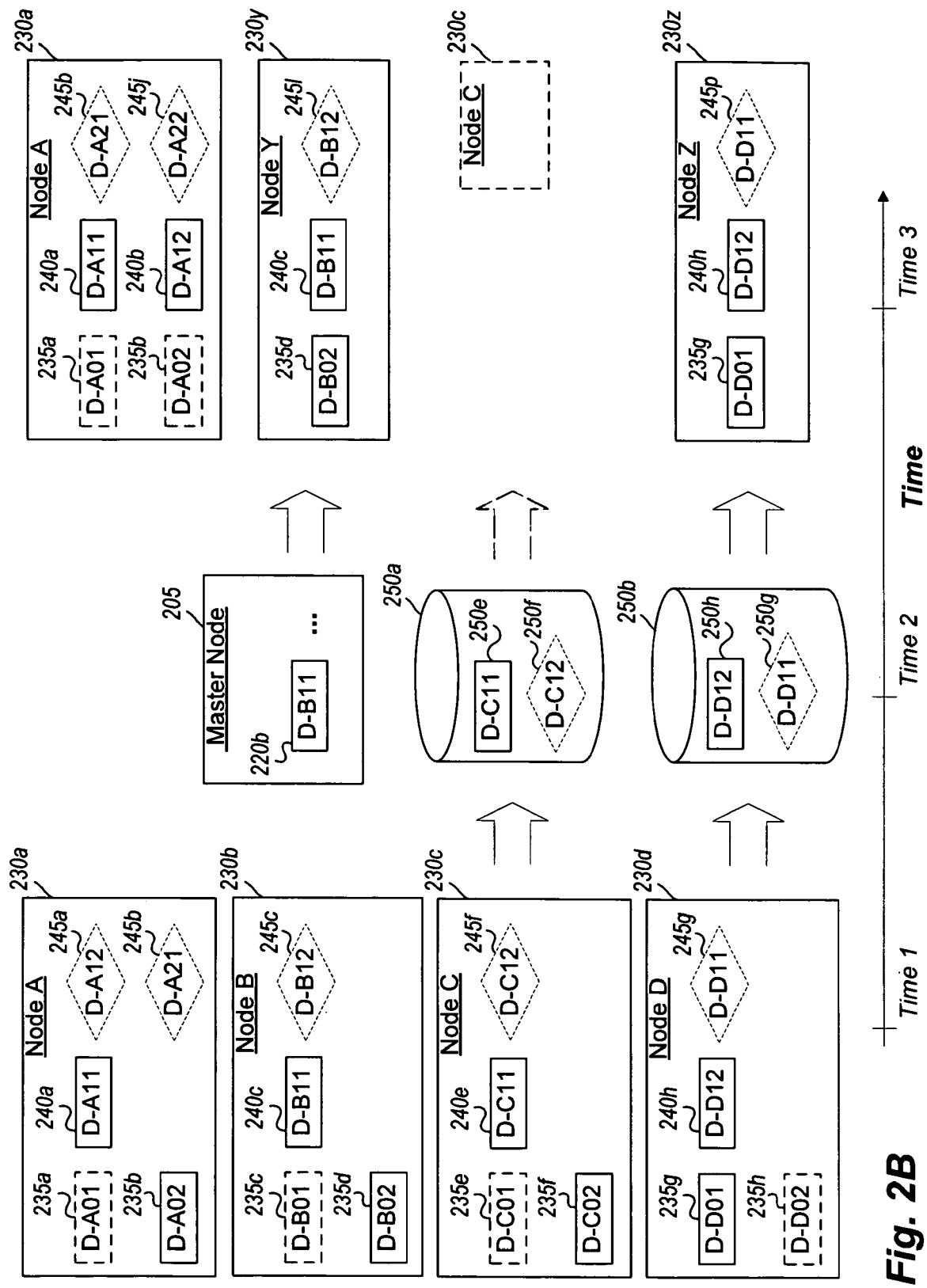

FIGS. 2A and 2B illustrate particular examples of managing distributed program execution on multiple computing nodes, such as that may be automatically performed by an embodiment of a DPESSM module. For example, with respect to FIG. 2A, several computing nodes 205 and 230 are illustrated that are currently involved in the distributed execution of an example program, referred to in this example as Program X. In this example, a DPE service (not shown) has created a master node 205 to assist in managing the distributed execution of Program X, such as to store various status information regarding the ongoing execution of Program X (e.g., under the control of a corresponding software module, not shown, that is executing on the master node 205 or elsewhere). The computing nodes 230 in this example are the multiple computing nodes that are selected to be used in the distributed execution of Program X, with four such computing nodes 230a-230d being illustrated in this example.

In this example, the master node 205 maintains various execution state information 210 regarding the distributed execution of Program X, such as to track the status of execution of execution jobs on each of the computing nodes 230. In particular, in this example, each line or entry in the information 210 corresponds to the performance of a particular operation for a particular execution job on a particular computing node, with information being tracked that in this example includes an identification 210a of the computing node, of the execution job 210b, of the operation 210c, of the status of performance of the operation 210f, of input data to be used by the operation 210d, of output data to be produced by the performance of the operation 210e, and optionally of various other information 210g. Such other status information may include, for example, information about dependencies or other inter-relationships between operations (e.g., operation B cannot be executed until after operation A is completed, operations C and D are to be executed simultaneously, etc.), information about expected completion of performance of an operation being performed (e.g., an expected completion time, an expected amount of time until completion, a percentage completion of an operation, a percentage of the operation that remains to be performed, etc.), information about expected initiation of performance of operations that are not yet being performed, etc.

In this example, the multiple computing nodes 230 include Node A 230a, and the execution of an example execution job J-A has been initiated on computing node 230a. In this example, execution job J-A includes operations to be performed that include at least example operations A01, A02, A03, and A04, and the first four entries in the status information 210 correspond to these operations for this execution job and computing node. In this example, operation A01 has already been completed, used input data D-A01 for its performance, and has produced output data D-A11. Operation A03 uses that output data D-A11 as input data, and is in progress of being performed to produce output data D-A21, but that output data has not yet been completed. Similarly, operation A02 is in progress and is using input data D-A02 to eventually produce output data D-A12. Because operation A04 uses that output data D-A12 as input data, operation A04 is queued and ready to be executed when its input data and the computing node 230*a* are available to perform it, but the performance of operation A04 has not yet begun.

The example information displayed for computing node 230*a* corresponds to the status information 210. In particular, in this example the computing nodes 230 are illustrated showing various information that is stored locally on the nodes, but other information is not illustrated in this example (e.g., locally stored information about the execution job being executed and the operations being performed), and details regarding how the local storage is performed are not shown. In particular, the example locally stored information on node 230*a* includes input data supplied for use in the execution of execution job J-A, including data 235*a* and 235*b*. In addition, intermediate data results that have been output from performed operations include the D-A11 output data 240*a* produced by the completed operation A01. In addition, in some embodiments, partial output data 245*a* and 245*b* may be generated and stored on node 230*a* as well in order to reflect the ongoing performance of operations (e.g., in this example, operations A02 and A03), while in other embodiments such partial output data may not be stored on node 230*a* in such a manner until the performance of the corresponding operations is completed.

The other entries in status information 210 correspond to the status of the other computing nodes 230*b*, 230*c*, and 230*d*. In particular, with respect to Node B 230*b*, it stores input data 235*c* and 235*d*, output data 240*c* from the completed operation B01, and optional partial output data results 245*c* corresponding to the in-progress performance of operation B02. Similarly, Node C 230*c* stores input data 235*e* and 235*f*, output data 240*e* from operation C01 whose performance is completed, and optionally partial intermediate output results 245*e*. Node D 230*d* similarly stores input information 235*g* and 235*h*, and optionally partial intermediate output results 245*g* and 245*h*, but in this example does not include any completed output data based on no operations of the execution job J-D having been completed.

In addition, in this example the master node 205 optionally also includes copies 220*a*, 220*b*, and 220*c* of the completed output data 240*a*, 240*c*, and 240*e*, respectively, such as to provide a persistent storage of the completed output data. In other embodiments, such intermediate output data may not be stored externally to the computing nodes 230, or instead may be stored externally to the computing nodes 230 but in a location other than the master node 205.

FIG. 2B continues the example of FIG. 2A, and in particular illustrates changes over time that may occur with respect to the example computing nodes 230. In particular, in the example of FIG. 2B, the computing nodes 230*a*, 230*b*, 230*c* and 230*d* are shown on the left at a first time Time 1 that corresponds to shortly after the time illustrated in FIG. 2A, and a later version of those computing nodes are shown on the right at a later time Time 3.

In this example, computing node Node A 230*a* continues its execution between Time 1 and Time 3, and operation A02 of execution job J-A has been completed at Time 3, causing output data 240*b* to be stored on node 230*a*. For example, if the partial data 245*a* was optionally stored on node 230*a* at Time 1, the output data 240*b* may be produced by modifying that partial data 245*a* to reflect the additional performance of operation A02 that occurs between Time 1 and Time 3. In addition, the computing node 230*a* at Time 3 now includes optional partial output data 245*j*, corresponding to the operation A04 having begun to be performed once the output data 240*b* is available. In addition, with respect to the version of node 230*a* at Time 1, the input data 235*a* is shown as being optional, such as to reflect that that particular input data has been used by the performance of operation A01, and may now optionally be deleted from the node 230*a* if it is no longer needed by any other operations of execution job J-A. Similarly, with respect to the version of node 230*a* at Time 3, both input data 235*a* and 235*b* are now shown as being optionally removed from node 230*a*, based on the further completion of operation A02 at that time.

While Node A 230*a* continues the execution of execution job J-A during the time between Time 1 and Time 3, the other computing nodes 230*b*, 230*c* and 230*d* are illustrated as being engaged in other activities. For example, with respect to Node D 230*d*, the DPE service determines to move the execution of execution job J-D from node 230*d* at Time 1 to a distinct computing node Node Z 230*z* at Time 3 (which in this example may be substantially immediate with respect to Time 1, such as only seconds or minutes later, or instead much later, such as hours or days). In particular, in this example, node 230*d* was executing the execution job J-D at a rate slower than that of other computing nodes 230 (e.g., due to being over-utilized), which prompted the move to another computing node 230*z* that may be able to perform a more prompt execution of the execution job. For example, at the time illustrated in FIG. 2A, node 230*d* had not yet completed the performance of any of the operations of execution job J-D. In this example, however, at a time when the determination is made to terminate the execution of execution job J-D (e.g., at a time shortly before Time 1), status information 210*g* (not shown) is available that indicates that the performance of the operation D02 is near completion (e.g., based on percent completion of the performance of the operation or an expected time until completion), while the performance of the operation D01 is not near completion. Accordingly, the DPE service determines to delay the termination of execution job J-D slightly to allow the completion of the performance of operation D02, such that node 230*d* at Time 1 includes intermediate output data 240*h* from node 230*d* that corresponds to the completion of the performance of operation D02.

To terminate the execution of execution job J-D on node 230*d* at Time 1, at least some of the data locally stored on node 230*d* at Time 1 is persistently stored at a location remote from node 230*d* and node 230*z*, so that the data may be moved to node 230*z* at Time 3. In particular, in this example, the information to be moved is temporarily stored in a storage volume 250*b*, and the data stored in storage volume 250*b* includes a copy 250*h* of the intermediate output data 240*h* from node 230*d*. Similarly, if node 230*d* includes optional partial output information 245*g* that corresponds to the in-progress performance of operation D01, a copy 250*g* of that partial output information may optionally be stored on storage volume 250*b* as well in some embodiments, such as if it is possible for operation D01 to be resumed on computing node 230*z* in a manner to use that partial output data and continue performance of the operation from the point at which it was stopped. In addition, the storage volume 250*b* may optionally store other information from node 230*h* that is not shown in this example, such as input data on node 230*d* that will be used for the resumed execution (e.g., input data 235*g*), and/or software instructions or other information about the execution job J-D (e.g., parts of the execution job to be used to perform some or all of the operations of the job, such as the remaining operations).

After the intermediate output data from node 230*d* is stored on the logical storage volume 250*b*, it may be used to create a local version of the data on computing node 230*z* at Time 3 to facilitate the resumed execution of execution job J-D. If the logical storage volume 250*b* does not store information about the execution job J-D and/or about the input data 235*g*, such information may be retrieved and locally stored on node 230*z* from other sources, such as the original source for supplying such information to node 230*d* when execution of execution job J-D was initiated. Alternatively, in other embodiments, if node 230*z* is available concurrently with node 230*d*, some or all of the previously described information may be copied directly from node 230*d* to node 230*z* without using the intermediate logical storage volume 250*b*.

In a manner similar to that of node 230*d*, the DPE service determines to suspend the execution of execution job J-C from node 230*c* at Time 1, such as to allow the execution to be resumed on node 230*c* or another node at a later time. In this example, the resumption of the execution of execution job J-C has not occurred as of time 3. To suspend the execution, similar actions are taken for node 230*c* as previously described with respect to node 230*d*, including to store a copy 250*e* of intermediate output data 240*e* from node 230*c* on logical storage volume 250*a* created for node 230*c*. As with logical storage volume 250, logical storage volume 250*a* may further optionally store a copy 250*f* of partial output data 245*f*, information about the execution job J-C, and some or all of the input data used by node 230*c*. When the execution of execution job J-C is later resumed, the computing node used to resume the execution will similarly receive local copies of the various information stored in the storage volume 250*a*, and optionally information from other sources as well.

While not illustrated in this example, the suspension of the execution job J-C on node 230*c* at Time 1 may be performed as part of suspending all execution jobs of Program X at that time. If so, similar actions would be taken to persistently store partial execution state information for each of the other computing nodes 230 that are currently executing Program X execution jobs. Furthermore, state information 210 from master node 205 may similarly be persistently stored for later use upon resumption of the execution of Program X. In addition, when such a later resumption of the execution of Program X occurs, it may be performed in various manners. For example, the resumption of the Program X execution may be performed on some or all of the same nodes 230 as were previously used, or instead on completely different computing nodes. In addition, the number of and/or capabilities of the computing nodes used for the resumed execution may differ from the nodes 230 used before the execution is terminated, such as to include more nodes or less nodes (e.g., as part of re-sizing the computing nodes used for the resumed execution, such as to continue the resumed execution at a rate that is faster or slower than the prior rate of execution). Furthermore, while not illustrated in this example, in some embodiments and situations, different users or other entities may be involved in different parts of the distributed execution of a program, such as to have a first user initiate distributed execution of a program, a second user initiate a first suspension of execution of that program, a third user initiate a first resumed execution of that program, etc. Such two or more different users may, for example, represent a single entity, not represent the same entity but be affiliated in one or more other manners (e.g., based on working together), have authorization that has been granted to perform specified actions for other users, etc.

Node B 230*b* illustrates an example of execution of execution job J-B that is terminated prematurely without an opportunity to persistently store at least some of the information on node 230*b* to a corresponding storage volume, such as if Node B fails during the execution. In this example, operation B01 has completed and produced output data D-B11 240*c* at Time 1, which in the example of FIG. 2A optionally has a copy 220*b* stored remotely from node 230*b* on master node 205. Accordingly, a representation of node 205 is shown in FIG. 2B that stores that copy 220*b*, and that stored information may be used to resume execution of execution job J-B on another computing node Node Y 230*y* at Time 3. However, if partial output data 245*c* had been present on node 230*b* at Time 1 to correspond to the partial performance of operation B02, such information is not preserved in this example, and thus the corresponding operation B02 will need to be re-performed from the beginning during the execution resumption to re-generate the partial output data, such as is illustrated with the optional output data 245*l* on node 230*y*. Similarly, other information stored on node 230*b* that may be stored in the corresponding storage volumes 250*a* and 250*b* may not have been preserved, such as input data 235*d* and information about instructions or other portions of execution job J-C, and thus the input data 235*d* and execution job information (not shown) on node 230*y* at Time 3 will be obtained from external sources in a manner similar to that of node 230*b* when execution of execution job J-B was originally initiated.

While not illustrated in the example of FIG. 2B, it will be further appreciated that the master node 205 may at times also become unavailable, whether based on a managed termination of its execution (e.g., in response to a request from a user associated with Program X or on an automated determination by the DPE service, such as to reflect the suspension of execution of Program X for a period of time) or due to failure of the master node. When the master node 205 becomes unavailable, the current execution state information 210 may also become unavailable if it is not persistently stored elsewhere. Accordingly, in at least some embodiments, the state information 210 may also be stored in a remote logical volume or other persistent storage location before such execution termination or other unavailability of the master node 205, such as in a manner similar to that previously described for nodes 230*c* and 230*d* and storage volumes 250*a* and 250*b*. Furthermore, such stored state information 210 may be later retrieved and used when a replacement master node is initiated to manage the resumed distributed execution of Program X (whether on the same computing system as the prior master node 205 or instead on a different computing node), so as to facilitate the resumption of the execution of Program X from the intermediate partial execution state at the time the state information 210 was stored.

It will be appreciated that the information in the examples of FIG. 2A and FIG. 2B has been provided for illustrative purposes only, and various details have been shown in an abstract manner or not illustrated for the sake of understanding. Furthermore, it will be appreciated that while only four computing nodes 230 and four execution jobs have been illustrated, in actual embodiments the actual quantities may be much larger, such as to include hundreds or thousands or millions of computing nodes and/or execution jobs.

In addition, as previously discussed, the managing of distributed execution of programs may be performed in various manners in various embodiments. For example, the determination of which computing nodes to use for execution of a program may be made in a variety of ways, including based on any preferences and/or requirements specified in the request or otherwise specified for the program and/or associated user (e.g., at a time of registration, etc.). For example, if criteria are determined for preferred and/or required resources for execution of a program (e.g., memory and/or storage; CPU type, cycles or other performance metric; network capacity; platform type, etc.), the selection of appropriate computing nodes to use may be based at least in part on whether the computing nodes have sufficient resources available to satisfy those resource criteria. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In addition, as previously noted, in at least some embodiments, execution of an execution job that is automatically terminated may be automatically resumed at a later time by the DPE service. For example, in some such cases, the DPE service may continue to try to execute such an execution job until completion of the requested execution, until execution is cancelled or otherwise explicitly terminated by a user, until occurrence of a specified time (e.g., until occurrence of an expiration time, until occurrence of a cumulative execution time, etc), until occurrence of a specified number of executions, indefinitely, etc. In addition, in at least some such embodiments, at least some execution jobs that are automatically terminated may be automatically resumed on behalf of the user at a future time when a sufficient amount of program execution capacity again becomes available to continue the execution.

In some embodiments, fees may be associated with the use of a DPE service, such that the DPE service may perform distributed execution of programs on behalf of a user in exchange for payment of one or more fees by that user. For example, in some embodiments, fees may be charged to a user based on an amount and/or type of distributed program execution capacity allocated for executing one or more programs on behalf of a user, such as based on one or more of a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc. In at least some embodiments, a provider of a DPE service may offer one or more of various tiers, types and/or levels of services or functionality for distributed execution of programs on behalf of multiple users, and in some such embodiments, various fees may be associated with the various tiers, types and/or levels of services. Additional details related to various fees associated with a distributed program execution service are included in pending U.S. patent application Ser. No. 11/963,331, filed Dec. 21, 2007 and entitled "Providing Configurable Pricing for Execution of Software Images," which is hereby incorporated by reference in its entirety.

Furthermore, various other types of functionality may be provided and used by a DPE service in various embodiments, as discussed in greater detail elsewhere.

Figure 3:
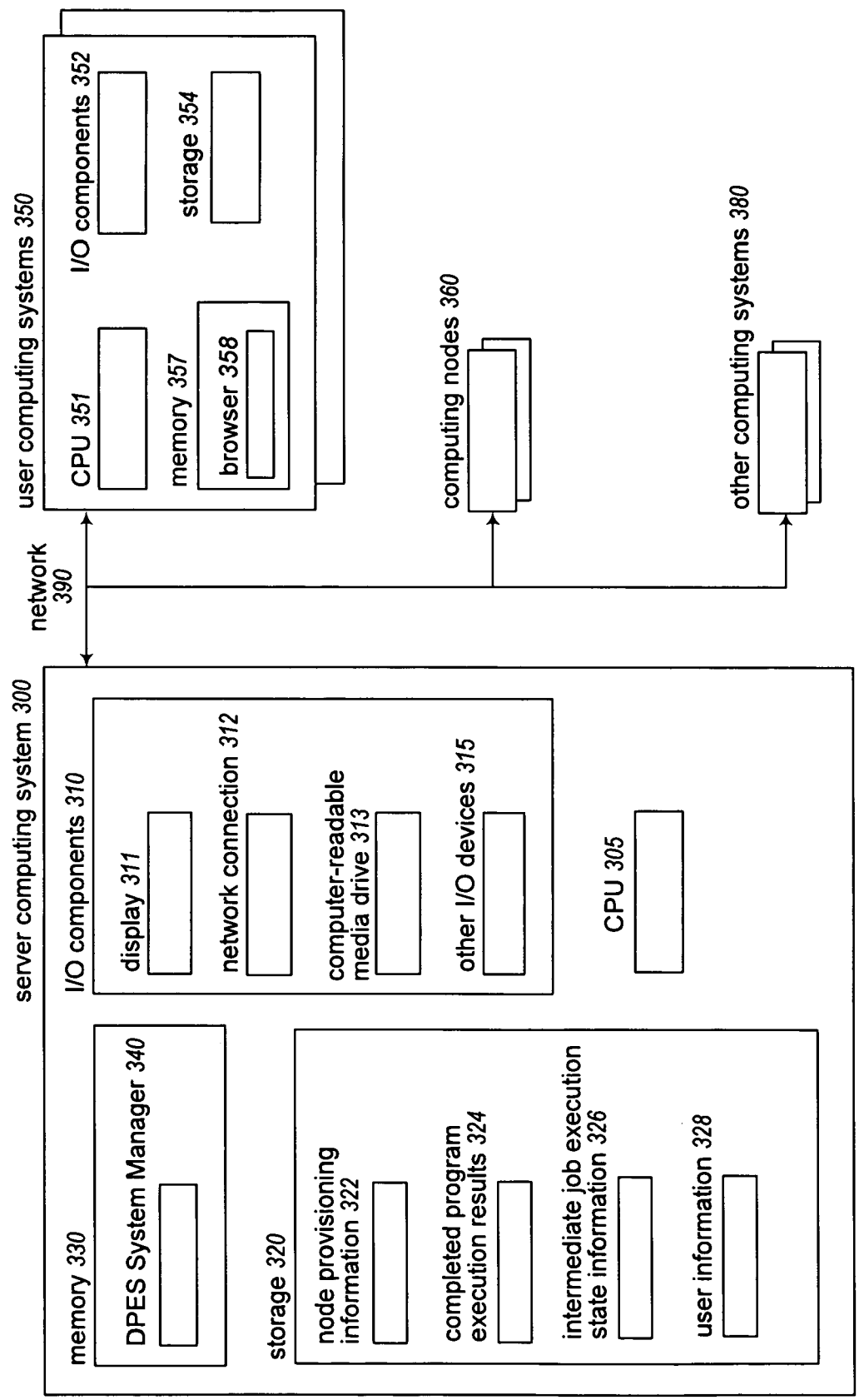
FIG. 3 is a block diagram illustrating an example embodiment of a computing system for managing distributed program execution.

FIG. 3 is a block diagram illustrating an example embodiment of a system suitable for performing techniques to manage distributed execution of programs. In particular, FIG. 3 illustrates a server computing system 300 suitable for executing an embodiment of a Distributed Program Execution Service System Manager module, as well as various user computing systems 350, computing nodes 360, and other computing systems 380. In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352, storage 354, and memory 357. The other computing systems 380 and computing nodes 360 may also each include similar components to some or all of the components illustrated with respect to server computing system 300, but such components are not illustrated in this example for the sake of brevity.

An embodiment of a Distributed Program Execution Service System Manager module 340 is executing in memory 330, and it interacts with computing systems 350 and 380 and computing nodes 360 over the network 390 (e.g., via the Internet and/or the World Wide Web, via a private cellular network, etc.). In this example embodiment, the DPESSM module 340 includes functionality related to managing distributed execution of programs on computing nodes 360 by various users (not shown) interacting with user computing systems 350, such as in conjunction with a DPE service managed by the DPESSM module 340. The other computing systems 350 and 380 and computing nodes 360 may be executing various software as part of interactions with the DPESSM module. For example, user computing systems 350 may be executing a Web browser 358 or other software in memory 357 to interact with DPESSM module 340, such as to configure and/or request execution of programs on behalf of the users of those systems on one or more computing nodes 360 in various ways. In addition, one or more users of the user computing systems 350 may interact with DPESSM module 340 to perform various other types of actions, as discussed in greater detail elsewhere.

Various information related to the operation of the DPESSM module 340 may be stored in storage 320, such as information 322 related to configuration of computing nodes to execute programs, information 328 about users of the distributed program execution service, information 324 that includes final execution results from program execution that has been completed, and information 326 to store status information about the intermediate state of partial execution of various programs. In addition, various intermediate state information and other information may be persistently stored in various manners, as discussed in greater detail elsewhere, including on storage 320 of server computing system 300, on other computing systems 380, or on other computing nodes/systems or storage nodes/systems (not shown).

After the DPESSM module 340 receives requests (or other indications) to execute one or more programs on one or more computing nodes 360, the DPESSM module 340 selects the computing nodes that will perform the distributed execution of the one or more programs, and initiates execution of execution jobs of those programs on those computing nodes 360. In addition, the DPESSM module 340 may further interact with computing nodes 360 to terminate execution of execution jobs on the computing nodes and to resume previously terminated execution. The DPESSM module 340 may also monitor or otherwise interact with one or more of the computing nodes 360 to track use of those computing nodes. Additional details related to these operations are included elsewhere.

The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the DPESSM module 340 may interact with one or more other computing systems 380 to initiate or terminate execution of one or more programs on those computing systems, such as if the computing systems 380 are provided by one or more third-party participants.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated DPESSM module 340 may in some embodiments be distributed in additional modules. Similarly, in some embodiments some of the functionality of the DPESSM module 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
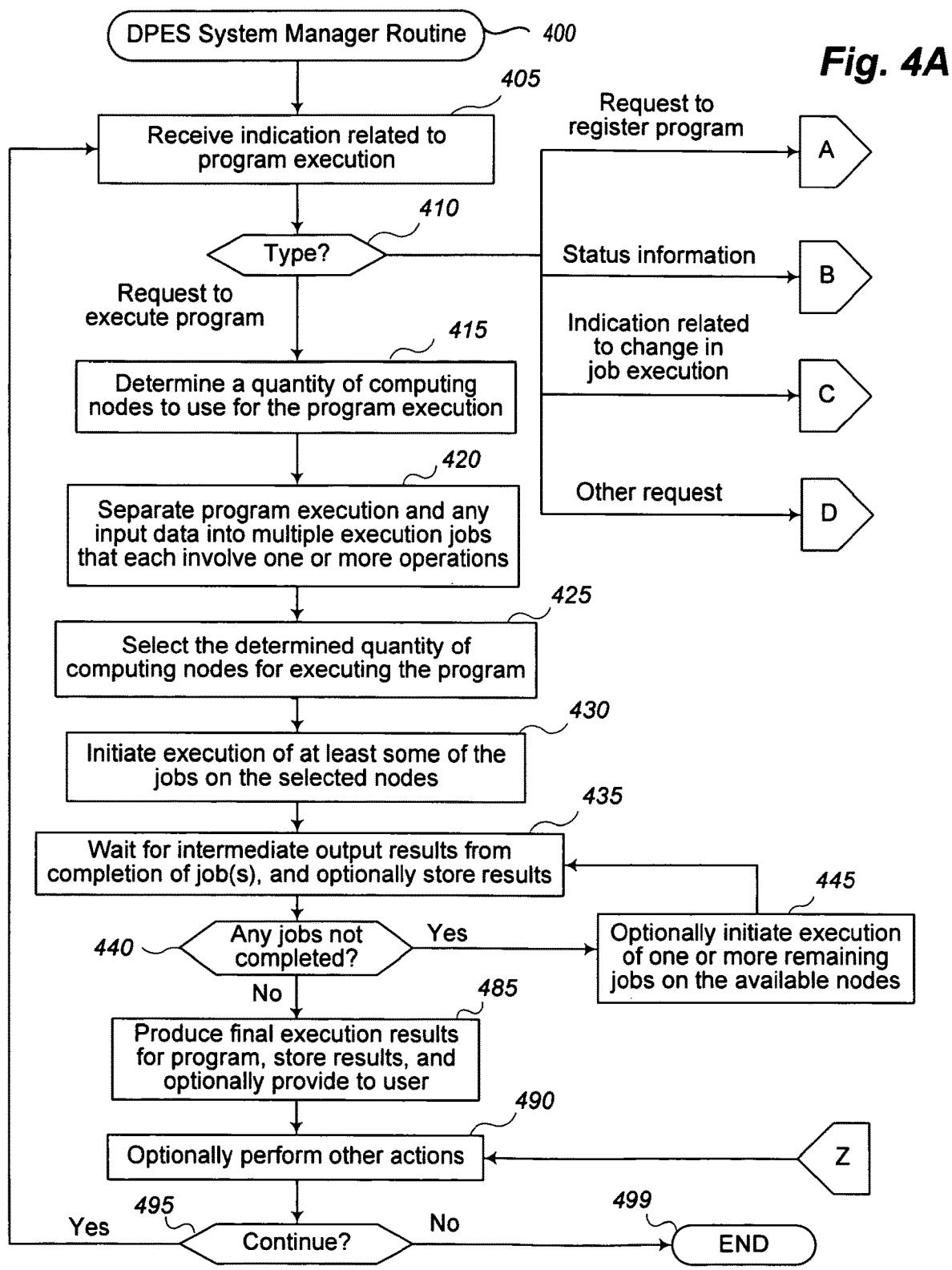
FIGS. 4A and 4B illustrate a flow diagram of an example embodiment of a Distributed Program Execution Service System Manager routine.
Figure 4B:
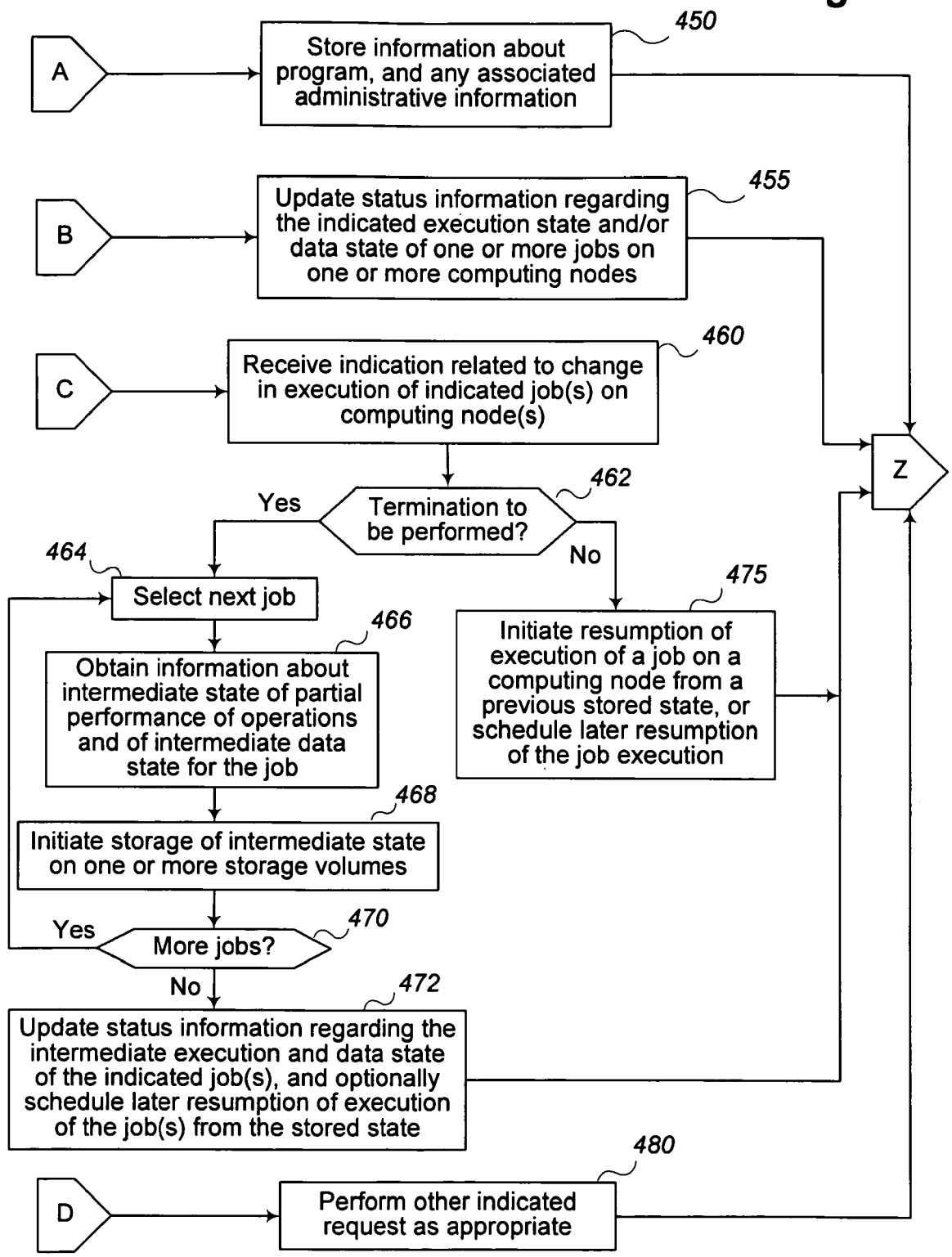

FIGS. 4A and 4B are a flow diagram of an example embodiment of a Distributed Program Execution Service System Manager routine 400. The routine may be provided by, for example, execution of the DPESSM modules 110 and 180 of FIGS. 1A and 1B, respectively, and/or the DPESSM module 340 of FIG. 3, such as to manage distributed execution of programs, as well as to perform other types of actions in some situations. In this illustrated embodiment, the routine 400 manages various aspects of use of a DPE service that performs distributed execution of programs on behalf of multiple users.

In the illustrated embodiment, the routine begins at block 405, where information related to distributed program execution is received. The routine continues to block 410 to determine the type of received information. If it is determined in block 410 that a request is received to initiate execution of a program, such as from a user, the routine continues to block 415 to determine a quantity of computing nodes to be used for the program execution. In block 420, the routine separates the program execution and any received input data into multiple execution jobs that each involves one or more operations to be performed. The actions in blocks 415 and 420 may be performed in various manners in various embodiments, as discussed in greater detail elsewhere. For example, the quantity of computing nodes to use for program execution may be specified as part of the request received in block 405, or it may instead be determined based on other factors (e.g., a number of computing nodes that are currently available from the DPE service, a number of computing nodes to correspond to a number of execution jobs into which the program execution is separated, an amount of fees paid by a user on whose behalf the request is made, etc.). Similarly, the program execution separation may be performed in various manners, such as in a manner specified from a user from whom the request is received, and/or in an automated manner based at least in part on the design of the program. After block 420, the routine continues to block 425 to select the determined quantity of computing nodes for use in distributed execution of the program, and in block 430 initiates the execution of at least some of the execution jobs on the selected nodes. As discussed in greater detail elsewhere, in some embodiments a user may specify a variety of other types of information, such as may be received as part of the request 405 and used as part of the actions in blocks 415-430.

After block 430, the routine waits in block 435 for execution jobs to complete and to optionally provide corresponding output data, such as may be used as input data to other execution jobs and/or may be used as part or all of the final results for the execution of the program. In some embodiments, the computing nodes may supply such output information back to the routine 400, such as for storage in a long-term storage location of the DPE service, while in other embodiments the output results may instead be stored on the computing nodes, and/or stored by the computing nodes on one or more long-term storage locations remote from the computing nodes. In the illustrated embodiment, blocks 430-445 are illustrated as being performed in a synchronous manner in which the routine 400 waits for execution jobs to complete before performing other actions. It will be appreciated that in other embodiments the routine 400 may operate in other manners, such as in an asynchronous manner to perform other actions with respect to executing the current program and/or to executing other programs for other users.

In the illustrated example routine 400, after one or more execution jobs are determined in block 435 to be completed, the routine continues to block 440 to determine whether there are more execution jobs to be executed and/or to be completed. If so, the routine continues to block 445 to optionally initiate execution of one or more remaining execution jobs on the available computing nodes, such as if those remaining execution jobs were waiting for output data from one or more of the completed execution jobs, or if instead there are more execution jobs than computing nodes and the newly available computing nodes from the completion of the other execution jobs performance are now used to execute remaining execution jobs. After block 445, the routine returns to block 435 to wait for completion of other execution jobs.

If it is instead determined in block 440 that all of the execution jobs have completed, the routine continues to block 485 to produce final execution results for the program, and to optionally store those final results and/or provide them to the user. The final execution results may be generated or otherwise produced in various manners in various embodiments, such as by combining output results from multiple execution jobs in various ways, selecting the output results from a single execution job to use, etc.

If it was instead determined in block 410 that the information received in block 405 was a request to register a program for later use, such as from a user, the routine instead continues to block 450 to store information about the program, along with associated administrative information (e.g., information about the user who submitted the program and/or about execution of the program, such as how to separate the program into multiple execution jobs). In some embodiments, such programs may be registered by users before they are used, such as to increase the speed of executing the program when such a program execution request is later received. Furthermore, in some embodiments, such a request to register a program may include a request to schedule later execution of the program, such as at an indicated time or when one or more indicated criteria are satisfied (e.g., when sufficient excess computing capacity of the DPE service is available to execute the program at a low priority).

If it is instead determined in block 410 that the information received in block 405 is status information related to execution of an execution job on a computing node for a program, such as may be supplied by that computing node or execution job (e.g., after being previously requested by the routine 400 with respect to block 490), the routine continues to block 455 to update status information that is maintained by the routine 400 regarding the intermediate state of execution of that execution job and program. As discussed in greater detail elsewhere, the status information may include information about particular operations that have been initiated, completed, or are in progress, information about input data that has been used by the execution, information about output data that has been generated by completion of some or all operations, information about partial intermediate data that reflects ongoing execution of the execution job, etc.

If it is instead determined in block 410 that the information received in block 405 is an indication related to changing execution of one or more execution jobs for one or more programs, such as from users who initiated that execution and/or as previously specified by the routine 400 with respect to block 490, the routine continues to block 460 to receive information related to the execution change. In block 462, the routine then determines whether the request relates to a termination of one or more currently executing execution jobs, or if it is instead related to resuming execution of a previously terminated execution job. If the latter, the routine continues to block 475 to initiate the resumption of execution of a previously terminated execution job on a computing node, such as by using previously stored state information about the intermediate results from the previous partial execution of the execution job, or instead schedules a later such resumption of the execution job if so indicated in the information received in block 460.

Otherwise, if there are one or more currently executing execution jobs to be terminated, the routine continues from block 462 to block 464 to select the next such execution job, beginning with the first. In block 466, the routine then obtains information about the current intermediate state of the partial execution of the operations being performed for the execution job and about the current data state for the execution job, and in block 468 initiates the storage of the intermediate state information on one or more storage volumes remote from the computing node that will persistently store the information for later use. In other embodiments, such as if the computing node includes management software to perform such intermediate state storage actions or if the execution job itself is configured to save its own intermediate state when instructed, the routine 400 may instead in block 466 and 468 send a message to the computing node and/or execution job to initiate such storage and then shut down. Furthermore, previously saved status information about the execution job may in some situations be used in blocks 466 and 468, such as to determine what intermediate state information is be stored, and any new information obtained in block 466 (e.g., by communicating with the computing node and/or execution job) may be used to update the status information for that execution job. The routine then continues to block 470 to determine if there are more execution jobs to be terminated, and if so returns to block 464. As previously discussed, in some embodiments the termination may include terminating all execution jobs currently being executed for a program, such as to temporarily suspend execution of the program.

If it is instead determined in block 470 that there are no more execution jobs to terminate, the routine in block 472 updates status information regarding the intermediate state of the terminated execution jobs, and optionally schedules a later resumption of the execution of some or all of the execution jobs from the stored intermediate state. For example, in situations in which one or more execution jobs are being moved from a first group or one or more computing nodes to a second group or one or more other computing nodes, the later scheduled resumption of the execution of those execution jobs may occur in a substantially immediate manner, such that a user may be unaware of the termination and resumption of execution or of the movement of the execution job between computing nodes. In addition, the scheduling of the later resumption may include initiating a new request to be received in block 405 at the time of the later resumption that will prompt the previously discussed resumption activities with respect to block 475 for those execution jobs.

If it instead determined in block 410 that the type of information received in block 405 is another type of request, the routine continues instead to block 480 to perform the other indicated request as appropriate. Such other requests may include, for example, administrative operations with respect to users, such as users registering with the DPE service, users checking account information or other information of the DPE service, users monitoring ongoing execution of their programs (e.g., by receiving some or all information about the intermediate state or other status of one or more of the execution jobs for the program), users providing payment with respect to currently or previously requested program executions or other provided functionality, etc.

After blocks 450, 455, 460, 472, 475, 480, or 485, the routine continues to block 490 to optionally perform one or more other tasks. Such other tasks may include, for example, one or more of the following: monitoring the execution of various programs, such as by sending requests for status information to computing nodes (e.g., periodically, when indicated criteria are satisfied, etc.); automatically determining to terminate execution of execution jobs and/or to resume previously terminated execution of execution jobs in various circumstances, such as at scheduled times, to accommodate moving execution jobs between computing nodes, to maintain requested QoS levels for execution of a program (e.g., by maintaining execution of execution jobs within a maximum proximity to each other and/or to input data being used by the execution jobs, by maintaining a minimum proximity of execution to each other to enhance availability and reliability in the event of failure of multiple computing nodes in a single geographical location, etc.), to manage under-utilization and over-utilization of computing nodes, etc. After block 490, the routine continues to block 495 to determine whether to continue, such as until an explicit indication to terminate is received (e.g., from an operator of the DPE service). If it is determined to continue, the routine returns to block 405, and if not continues to block 499 and ends.

Figure 5:
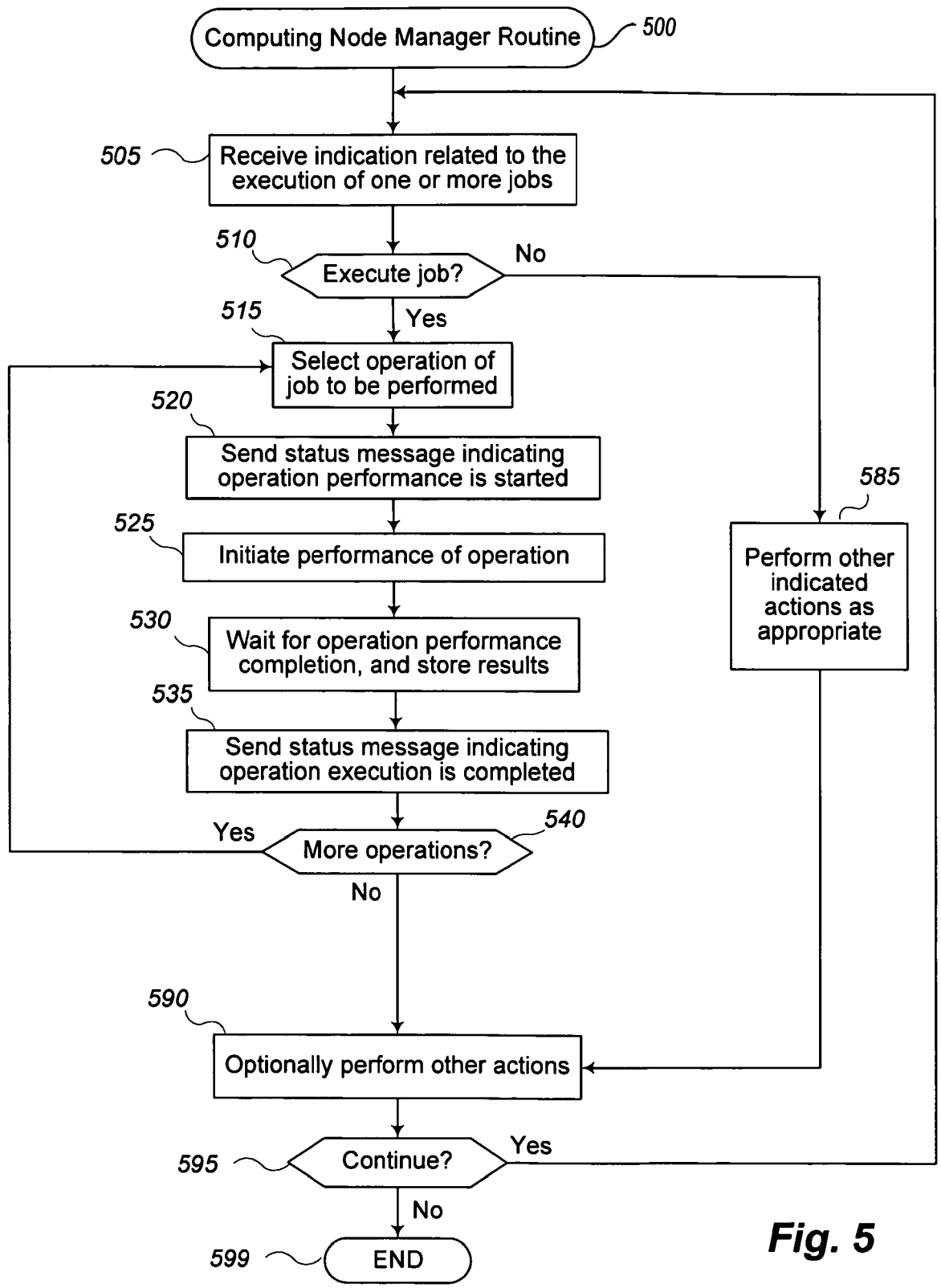
FIG. 5 illustrates a flow diagram of an example embodiment of a Computing Node Manager routine.

FIG. 5 is a flow diagram of an example of a Computing Node Manager routine 500. The routine may be provided by, for example, execution of module 179 of FIG. 1B, or of other management software executing on computing nodes 120 of FIG. 1A, computing systems 182 of FIG. 1B, computing nodes 360 of FIG. 3, etc. In the illustrated embodiment, the management software on a computing node manages some aspects of the execution of execution jobs on the computing node, while in other embodiments some or all of the functionality described with respect to FIG. 5 may instead be performed by the System Manager routine 400 of FIGS. 4A and 4B, or instead by an execution job that is being executed on the computing node.

In the illustrated embodiment, the routine begins at block 505, where an indication is received related to the execution of one or more execution jobs on the computing node. The routine continues to block 510 to determine whether the indication is to initiate execution of an indicated execution job. If so, the routine determines the multiple operations to be performed for the execution job (e.g., based on the information received about the execution job in block 505 or that is otherwise retrieved from an external source), and continues to block 515 to select the next operation to be performed, beginning with the first. Blocks 515-540 are illustrated in this example embodiment as being performed in a serial manner, such that each operation is individually performed in a synchronous manner before the next operation is initiated, although it will be appreciated that in other embodiments the operations may be performed in other manners, such as to execute some or all of the operations in parallel and/or in an asynchronous manner.

After block 515, the routine continues to block 520 to send a status message to the routine 400 indicating that the execution of the selected operation has begun, and in block 525 initiates the performance of the operation. In block 530, the routine waits for the completion of the performance of the operation, and optionally locally stores any intermediate results produced by the operation performance. In block 535, the routine then sends another status message to the routine 400 indicating that the performance of the operation is completed. In block 540, the routine then determines whether there are more operations to be performed, and if so returns to block 515.

If was instead determined in block 510 that the received indication in block 505 was not to execute an execution job, the routine continues instead to block 585 to perform one or more other indicated operations as appropriate. For example, the information received in block 505 may be a request for status information from the routine 400, and if so block 585 may obtain and provide that status information to the routine 400. Alternatively, the information in block 505 may be an indication to terminate execution of the execution job, and the actions performed in block 585 may include corresponding actions (e.g., to clear intermediate state information that was temporarily stored on the computing node, such as after that information has been persistently stored elsewhere). In addition, actions performed with respect to block 585 may include a request from the routine 400 to initiate such persistent storage of intermediate state from partial execution of operations for a currently executing execution job, and if so the actions in block 585 may include performing such actions (whether immediately or instead after a short time to allow completion of performance of one or more operations). Furthermore, in some embodiments and situations, different execution jobs may coordinate in various manners, such as by exchanging information of interest, and the information in block 505 may be such information from another execution job of the program or a request from such other execution job for information from the current execution job.

After block 585, or if it is instead determined in block 540 that there are no more operations to be performed, the routine continues to block 590 to optionally perform one or more other tasks, such as to coordinate with other execution jobs of the program if appropriate, to take administrative actions as part of executing the execution job, etc. After block 590, the routine continues to block 595 to determine whether to continue, such as until an explicit indication to terminate is received (e.g., from the routine 400 or from a human operator of the DPE service). If it is determined to continue, the routine returns to block 505, and if not continues to block 599 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising: performing, by a network-accessible service:
   receiving (a) configuration information for a distributed execution of a program on multiple computing nodes, wherein the configuration information specifies (i) a selected type of computing node to use for the distributed execution and (ii) computing resource capacities of the selected type of computing node, and (b) at least two operations to be performed in the distributed execution of the program, including a first operation that is specified to operate on a portion of an input data and to produce an intermediate result and a second operation that is specified to operate on the intermediate result produced by the first operation;
   provisioning a plurality of virtual machines of the selected type and having the specified computing resource capacities as the multiple computing nodes to perform the distributed execution wherein the virtual machines are attached with respective logical storage volumes provided by a remote storage service;
   performing the distributed execution of the program on the multiple computing nodes within the network-accessible service including performing at least two execution jobs, wherein a first execution job for the first operation is to produce the intermediate result to be used by a second execution job for the second operation;
   causing the program to be suspended before the intermediate result is to be used by the second execution job, wherein the suspending of the program includes storing the intermediate result to the logical storage volumes;
   causing the program to be resumed, wherein the resuming of the program includes provisioning one or more other virtual machines as one or more other computing nodes configured to access the intermediate result stored in the logical storage volumes to complete the second execution job; and
   generating a final result produced by the second execution job.

2. The computer-implemented method of claim 1 wherein storing the intermediate result comprises persistently storing, at a time of the suspending of the program, information from a partial completion of the distributed execution that includes the intermediate result, and wherein the intermediate result is produced from the first execution job being completed at the time of the suspending of the program, wherein the second execution job is not completed at the time of the suspending of the program, and wherein the resuming of the program includes initiating resumed performance of the second execution job without further performing the first execution job.

3. The computer-implemented method of claim 2 wherein the network-accessible service is a distributed program execution service that provides a plurality of computing nodes configurable to execute programs for users of the distributed program execution service, wherein the multiple computing nodes are selected by the distributed program execution service from the plurality of computing nodes, and wherein the performing of the program and the causing of the program to be suspended and the causing of the program to be resumed are all performed on behalf of a single user of the distributed program execution service.

4. The computer-implemented method of claim 2 wherein the persistently storing of the information is initiated based at least in part on failure of one or more of the multiple computing nodes during the distributed execution, and wherein the resuming of the program includes executing the second execution job on at least one remaining computing node of the multiple computing nodes that is separate from the failed one or more computing nodes or on one or more additional computing nodes added to the multiple computing nodes to replace the failed one or more computing nodes.

5. The computer-implemented method of claim 2 wherein the persistently storing of the information is initiated based at least in part on determining to move the execution of the second execution job from one or more computing nodes of the multiple computing nodes to the one or more other computing nodes.

6. The computer-implemented method of claim 2 wherein the persistently storing of the information is initiated based at least in part on determining to perform administrative activities on one or more computing nodes of the multiple computing nodes.

7. The computer-implemented method of claim 2 wherein the persistently storing of the information is initiated based at least in part on determining to execute one or more other programs on one or more computing nodes of the multiple computing nodes, the one or more other programs having a higher priority than the program.

8. The computer-implemented method of claim 2 wherein the distributed execution of the program on the multiple computing nodes is managed by software executing on a master node, and wherein the persistently storing of the information is initiated based at least in part on failure of the master node.

9. The computer-implemented method of claim 8 wherein the persistently storing of the information includes persistently storing maintained information from the master node, wherein the resuming of the program includes initiating execution of a second master node and restoring, on the second master node, the maintained information from the master node, and wherein further resumed performance of the program is managed by the second master node.

10. The computer-implemented method of claim 1 wherein the configuration information specifies information about a quantity of computing nodes on which to perform the at least two operations and information about one or more criteria to use in selecting those computing nodes for use as the multiple computing nodes, and wherein the performing of the program includes using the configuration information to select the computing nodes on which to perform the at least two operations.

11. A non-transitory computer-readable storage medium having stored instructions that, when executed, cause one or more computing systems to implement a network-accessible service configured to perform:

receiving (a) configuration information for a distributed execution of a program on multiple computing nodes, wherein the configuration information specifies (i) a selected type of computing node to use for the distributed execution and (ii) computing resource capacities of the selected type of computing node, and (b) at least two operations to be performed in the distributed execution of the program, including a first operation that is specified to operate on a portion of an input data to produce an intermediate result and a second operation that is specified to operate on the intermediate result produced by the first operation;

provisioning a plurality of virtual machines of the selected type and having the specified computing resource capacities as the multiple computing nodes to perform the distributed execution, wherein the virtual machines are attached with respective logical storage volumes provided by a remote storage service;

performing the distributed execution of the program on the multiple computing nodes within the network-accessible service including at least two execution jobs, wherein a first execution job for the first operation is to produce the intermediate result to be used by a second execution job for the second operation;

causing the program to be suspended before the intermediate result is used by the second execution job, wherein the suspending of the program includes storing the intermediate result to the logical storage volumes;

causing the program to be resumed, wherein the resuming of the program includes provisioning one or more other virtual machines as one or more other computing nodes configured to access the intermediate result stored in the logical storage volumes to complete the second execution job; and generating a final result produced by the second execution job.

12. The non-transitory computer-readable medium of claim 11 wherein, to store the intermediate result, the stored instructions when executed cause the one or more computing systems to persistently store, at a time of the suspending of the program, information from a partial completion of the distributed execution that includes the intermediate result.

13. The non-transitory computer-readable medium of claim 12 wherein the persistently storing of the information is initiated based on at least one of failure of one or more of the multiple computing nodes during the distributed execution, determining to move the execution of the second execution job from one or more computing nodes of the multiple computing nodes to the one or more other computing nodes, determining to perform administrative activities on one or more computing nodes of the multiple computing nodes, or determining to execute one or more other programs with a higher priority than the program on one or more computing nodes of the multiple computing nodes.

14. The non-transitory computer-readable medium of claim 12 wherein the distributed execution of the program on the multiple computing nodes is managed by software executing on a master node, wherein the persistently storing of the information is initiated based at least in part on failure of the master node and includes persistently storing maintained information from the master node, and wherein the resuming of the program includes initiating execution of a second master node and restoring, on the second master node, the maintained information from the master node.

15. The non-transitory computer-readable medium of claim 11 wherein the stored instructions when executed cause the one or more computing systems to determine from the configuration information indicating information about at least one of a quantity of computing nodes on which to perform the at least two operations or information about one or more criteria to use in selecting those computing nodes for use as the multiple computing nodes, and wherein the performing of the program includes using the configuration information to select the computing nodes on which to perform the at least two operations.

16. A system, comprising:

one or more hardware processors; and one or more memories with stored instructions that, when executed by at least one of the one or more hardware processors implement a network-accessible service and cause the network-accessible service to perform:

receiving (a) configuration information for a distributed execution of a program on multiple computing nodes, wherein the configuration information specifies (i) a selected type of computing node to use for the distributed execution and (ii) computing resource capacities of the selected type of computing node, and (b) at least two operations to be performed in the distributed execution of the program, including a first operation that is specified to operate on a portion of an input data to produce an intermediate result and a second operation that is specified to operate on the intermediate result produced by the first operation;

provisioning a plurality of virtual machines of the selected type and having the specified computing resource capacities as the multiple computing nodes to perform the distributed execution, wherein the virtual machines are attached with respective logical storage volumes provided by a remote storage service;

performing the distributed execution of the program on the multiple computing nodes within the network-accessible service including at least two execution jobs, wherein a first execution job for the first operation is to produce the intermediate result to be used by a second execution job for the second operation;

causing the program to be suspended before the intermediate result is used by the second execution job, wherein suspending the program includes storing the intermediate result to the logical storage volumes;

causing the program to be resumed, wherein the resuming the program includes provisioning one or more other virtual machines as one or more other computing nodes configured to access the intermediate result stored in the logical storage volumes to complete the second execution job; and generating a final result that is produced by the second execution job.

17. The system of claim 16 wherein, to store the intermediate result, the stored instructions when executed cause the system to persistently store, before the suspending of the program, information from a partial completion of the distributed execution that includes the intermediate result.

18. The system of claim 17 wherein the persistently storing of the information is initiated based on at least one of failure of one or more of the multiple computing nodes during the distributed execution, determining to move the execution of the second execution job from one or more computing nodes of the multiple computing nodes to one or more other computing nodes, determining to perform administrative activities on one or more computing nodes of the multiple computing nodes, or determining to execute one or more other programs with a higher priority than the program on one or more computing nodes of the multiple computing nodes.

19. The system of claim 17 wherein the distributed execution of the program on the multiple computing nodes is managed by software executing on a master node, wherein the persistently storing of the information is initiated based at least in part on failure of the master node and includes storing maintained information from the master node, and wherein the resuming of the program includes initiating execution of a second master node and restoring, on the second master node, the maintained information from the master node.

20. The system of claim 16 wherein the stored instructions when executed cause the system to determine from the configuration information indicating information about at least one of a quantity of computing nodes on which to perform the at least two operations or information about one or more criteria to use in selecting those computing nodes for use as the multiple computing nodes, and wherein the performing of the program includes using the configuration information to select the computing nodes on which to perform the at least two operations.

* * * * *